United States Patent Office 3,499,852
Patented Mar. 10, 1970

3,499,852
COATING COMPOSITIONS CONTAINING POLYOL CROSSLINKING AGENT AND URETHANE PREPOLYMERS ENDBLOCKED WITH ETHYLENIC GROUPS
Herbert M. Schroeder, Williamsville, and Arthur J. Krawczyk, Cheektowaga, N.Y., assignors to Textron Inc., a corporation of Delaware
No Drawing. Filed Feb. 10, 1967, Ser. No. 615,071
Int. Cl. C08g 22/32
U.S. Cl. 260—18                                25 Claims

ABSTRACT OF THE DISCLOSURE

Liquid coating compositions are made with, as the film-forming ingredient, a polyisocyanate-polyol urethane prepolymer prepared with excess isocyanate, the free isocyanate groups of which are blocked with a monoethylenically-unsaturated compound containing a single isocyanate-reactive group. Diisocyanates (aliphatic or aromatic) are preferred, as are aliphatic polyols. Suitable blocking compounds include those containing a single —OH, —NH$_2$,

or —SH group; often preferred blocking compounds, especially where the polyisocyanate is aliphatic in character, are glycol esters of acrylic acids. The coating compositions may be moisture-curable or polyol-curable, and in the latter case can contain as a crosslinking agent, a polyhydroxyl-containing compound such as a polyhydroxyl-containing fatty acid ester, e.g. castor oil.

This invention relates to polyurethane coating compositions. More particularly, it relates to normally-liquid coating composition comprising as the film-forming ingredient a urethane prepolymer which is end-blocked with a monoethylenically-unsaturated compound, said compound being monofunctional as regards isocyanate-reactive groups.

Blocked urethane prepolymers for use in coating compositions have been known for some time. For example, trimethylol propane-tolylene diisocyanate prepolymers blocked with phenol, a commercially available material, is a well known film-forming ingredient often used in combination with cross-linking agents such as hydroxyl-terminated polyesters in formulating polyurethane coating compositions. Since urethane prepolymers prepared with an excess of isocyanate reactant, and thus containing free isocyanate groups, will react at room temperature with a number of contaminants including, for example, water, which may be present in the air, container surfaces, pigments, solvents, etc., which come into contact with the prepolymer—the stability of the material is achieved only with meticulous care in preparation, handling and storage. If, however, the excess isocyanate groups are efficiently blocked, they will be unavailable for reaction until the blocking agent is released, as, for example, by heating; thus, adventitious water will not affect stability.

With coating compositions containing conventional blocked urethane prepolymers, the isocyanate is regenerated by heat and the blocking agent is evaporated from the film. Usually the blocking agent is wasted and may create a problem of disposal. Phenol, for instance, is obnoxious and toxic, and may contribute to air and stream pollution.

By the present invention it has been found that urethane-based coating compositions having excellent storage stability without the disadvantages of prior compositions are obtained by the use of a monoethylenically-unsaturated material as the isocyante-reactive blocking agent. Moreover, cured films prepared from the compositions of this invention exhibit excellent properties of hardness, mar resistance, flexibility, and clarity.

The normally-liquid coating composition of the present invention contains, as the film-forming ingredient, the reaction product of (A) an organic polyisocyanate-aliphatic polyol urethane prepolymer prepared with excess isocyanate and (B) a monoethylenically-unsaturated aliphatic compound possessing only one isocyanate-reactive radical per molecule, said radical being one containing active hydrogen as, for example, —SH, —OH, —NH$_2$ and

radicals, wherein R is alkyl, say of 1 to about 10, preferably of about 3 to 10, carbon atoms.

The base urethane prepolymers of the invention are made by reaction of an excess of an organic polyisocyanate with a urethane-forming aliphatic polyol. Suitable organic polyisocyanates include, for example, aliphatic and aromatic polyisocyanates, polyisothiocyanates, etc. Specifically illustrative of suitable polyisocyanates are the diisocyanates, e.g., tolylene diisocyanates, diphenyl-methane-4,4'-diisocyanate, dicyclohexyl methane-4,4'-diisocyanate, 1-isocyanato-3-isocyanatomethyl-3,5,5-trimethylcyclohexane, hexamethylene diisocyanate, bis(2-isocyanoethyl) fumarate, and the like.

Aromatic disocyanates having the isocyanate groups attached to one or two aromatic rings are often preferred. The isocyanates may be substituted with non-interfering groups, such as aliphatic hydrocarbon radicals, e.g., lower alkyl groups. Suitable aromatic diisocyanates include 2,6-tolylene diisocyanate, 2,4-tolylene diisocyanate, p-phenylene diisocyanate, p,p'-diphenylmethane diisocyanate, 1,5-naphthylene diisocyanate, substituted aromatic diisocyanates, etc. The hydrocarbon portion of the aromatic diisocyanates has at least about 6 carbon atoms and usually does not have more than about 24 carbon atoms. Aromatic diisocyanates of 6 to 15 carbon atoms in the hydrocarbon group are preferred.

The amount of organic isocyanate component employed is usually such as to give a ratio of isocyanate groups to hydroxyl radicals in the polyol of about 1.2 to 2.5:1, preferably about 1.6 to 2:1. In any event, the prepolymer contains an excess of isocyanate groups sufficient to provide a moisture-curable or polyol-curable vehicle. The free isocyanate groups in the prepolymer, aside from any unreacted polyisocyanate present, are generally at least about 1 or 1.5 weight percent of the prepolymer, and may be as much as 22%. Where relatively high molecular weight polyols are employed in making the prepolymer it is often desired that the final product be moisture-curable. To this end a free isocyanate content in the prepolymer up to about 8%, say about 2 to 5%, is often preferred. Exemplary of such prepolymers are those prepared with polyoxyalkylene glycols of fairly high molecular weight, and therefore, low hydroxyl functionality in relation to molecular weight.

On the other hand, where simpler, lower molecular weight polyols of relatively high hydroxy functionality as, e.g., trimethylolpropane, are used in preparing the prepolymers, it is usually desired that, rather than moisture-curable, these prepolymers be polyol-curable, i.e., that they be curable with the aid of a polyhydroxyl-containing crosslinking agent such as castor oil. In these systems it is usually preferred that the prepolymer have a relatively high free isocyanate content prior to blocking, say in the range of about 11 to 22 weight percent of the prepolymer, about 15–18% being most preferred.

As indicated in the foregoing discussion, the polyol employed in making the urethane prepolymer may be selected from a wide variety of polyhydroxyl-containing materials, including hydroxyl-containing polyethers and polyesters as well as simple polyols. Aliphatic (including cycloaliphatic) polyhydroxyl-containing hydrocarbon (including substituted hydrocarbon) compounds are preferred, although polyol mixtures containing minor amounts of aromatic polyols may be employed if desired. The polyol may contain as few as 2 carbon atoms or may have a molecular weight as high as 3000 or more.

Among the suitable simple polyols and polyhydroxyl-containing polyethers are those represented by the general formula:

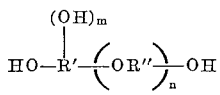

wherein R' is an aliphatic hydrocarbon radical, preferably alkyl, of 2 to about 12, preferably 2 to about 6, carbon atoms, and R'' is an alkylene radical of 2 to about 4, preferably 2 to 3, carbon atoms. The letter $n$ is a number from 0 to about 50, preferably about 2 to 30 for more flexible coatings; the letter $m$ is 0 to 2 or more. When $n$ has a value of 2 or more (providing a polyether) R' will often be the same as R'' and $m$ will preferably be zero. Non-deleterious substituents, preferably having no active hydrogen atoms, may likewise be present in the polyol.

As suitable simple polyols may be mentioned ethylene glycol, propylene glycol, trimethylol propane, 1,4-butane diol, trimethylol ethane, 1,6-hexamethylene glycol, 1,2,6-hexane triol, etc. As mentioned above, it is often preferred when using these so-called simple polyols that sufficient polyisocyanate be reacted therewith to provide a relatively large percentage of free isocyanate in the urethane prepolymer, and that the blocked prepolymer be cured with the aid of a higher molecular weight polyhydroxyl-containing crosslinking agent.

As suitable polyether polyols may be mentioned the polyoxyalkylene glycols such as polyoxyethylene glycols (preferably of up to about 2000 molecular weight), polyoxypropylene glycols (preferably of up to about 3000 molecular weight), polyoxybutylene glycols, adducts of 1,2,6-hexane triol and propylene oxide, etc. Polyether polyols, as above-mentioned, are ideally suited as the polyol reactant for the preparation of moisture-curable urethane prepolymers.

As stated above, others among the useful polyols for preparing the urethane prepolymer include polyhydroxyl-containing esters and polyesters, such as castor oil, polyol-modified triglyceride oils, and the like. Polyhydroxyl-containing polyesters are generally made by reaction of an excess of an aliphatic polyhydroxy alcohol, such as the simple polyols mentioned above, with one or more aliphatic (including cycloaliphatic) or aromatic polycarboxylic acids or anhydrides. Frequently, in the polyesters, the polyhydroxy alcohols are predominantly diols and the acids are dicarboxylic acids, including their anhydrides, and preferably contain from 4 to 50 carbon atoms, e.g., phthalic acid, adipic acid, sebacic acid, or dimers of olefinically-unsaturated monocarboxylic acids, such as linoleic acid dimer, etc.

The urethane prepolymers of the present invention, which are non-elastomeric, although they may be flexible, can be made by reaction of the organic polyisocyanate and the polyol at temperatures often in the range of about 40 to 130° C., with about 50 to 100° C. being preferred. The reaction is preferably continued until there is essentially little, if any, unreacted hydroxyl functionality remaining. Known polymerization techniques, such as stepwise mixing of the polyisocyanate with the polyol to enhance temperature control, may be utilized.

The prepolymer is commonly prepared in the presence of an essentially inert solvent. The solvent serves to insure that the reactants are in the liquid state, and the solvent permits better temperature control during the reaction by serving as a heat sink and, if desired, as a refluxing medium. Various solvents, including mixtures of such materials, may be employed; among the useful solvents are aromatic hydrocarbons, esters, ethers, ester-ethers, chlorinated hydrocarbons, etc. Frequently, the solvents are volatile materials which will evaporate from the coating composition while it cures; consequently there may be no need to remove any portion of the solvent from the reaction product prior to its application as a coating. The amount of solvent employed may vary widely, but too large a volume may be uneconomic or give materials with undesirably or inconveniently low viscosity. Thus, the amount of solvent may be selected in order to provide a reaction product of film application viscosity, but products of greater viscosity can be cut-back before use. Often about 0.25 to 6 weights of solvent, preferably about 0.5 to 2 weights of solvent, per weight of the total isocyanate and polyol, are used. Among the suitable normally liquid solvents are xylene, butyl acetate, methyl ethyl ketone, ethylene glycol ethyl ether acetate, 1,1,1-trichloroethane, dimethylformamide, dimethylsulfoxide, dioxane, etc. and their mixtures; it is preferred that the solvent not contain more than about 10 carbon atoms per molecule.

Blocking of the free isocyanate-containing prepolymer is effected by reaction of the substantially stoichiometrical equivalent of the monoethylenically-unsaturated blocking agent per equivalent of free isocyanate in the prepolymer. To effect the blocking of the prepolymer, the ethylenically-unsaturated blocking agent contains only one isocyanate-reactive radical per molecule. Aliphatic, monomeric compounds are preferred. Thus, suitable blocking agents include, for example, unsaturated hydroxy esters such as glycol esters of acrylic acids, aminoalcohol esters of unsaturated carboxylic acids such as butylaminoethyl methacrylate, amides of unsaturated carboxylic acids such as methacrylamide, unsaturated alcohols such as allyl alcohol, unsaturated hydroxy ethers such as unsaturated hydroxy acetals, 4-(4-hydroxybutyl)-2-vinyl-1,3-dioxolane, etc. Preferably, the blocking agent is terminally unsaturated as in the specific examples herein.

Often preferred blocking agents are those wherein the isocyanate-reactive radicals is a hydroxy group. Aliphatic diol esters of acrylic acids are especially suitable blocking agents for the compositions of the present invention. Suitable such esters may be represented by the formula:

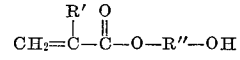

wherein R' is hydrogen or methyl and R'' is alkylene of 2 to about 5 carbon atoms. These hydroxy esters are often preferably used in blocking urethane prepolymers prepared with aliphatic polyisocyanates. Unsaturated alcohols, on the other hand, such as allyl alcohol often are more desirable with prepolymers prepared with aromatic polyisocyanates. As specific examples of suitable hydroxy esters may be mentioned propylene glycol monomethacrylate, propylene glycol monoacrylate, ethylene glycol monomethacrylate, etc.

The blocking of the urethane prepolymer can be effected by simply adding the above blocking agent to a solution of the polyisocyanate-aliphatic polyol reaction product. Temperatures for the blocking reaction may be about 25 to 145, preferably about 65 to 130° C., and the reaction may proceed for a time sufficient to provide blocking of substantially all of the free isocyanate groups of the prepolymer.

The blocked prepolymer-containing composition of the present invention is in an essentially liquid state for application as a coating on a substrate. The blocked prepolymer may itself be liquid or be placed in such state by dissolution in a suitable solvent.

The room temperature stability of the coating compositions of the present invention may be further enhanced, if desired, by the inclusion therein of minor amounts of vinyl polymerization inhibitors such as hydroquinone, the methyl ethyl ether of hydroquinone, etc. Heating of the compositions causes the prepolymer to unblock and make the isocyanate groups available for cross-linking. The ethylenic unsaturation of the released blocking agent allows for the formation of addition polymerizates of that compound in the cured product. As illustrated in the following examples, the addition of minor amounts of a curing catalyst such as dicumyl peroxide can serve to accelerate curing times. Similarly, other organic peroxides, for example, ditertiarybutyl peroxide, benzoyl peroxide, cumene hydroperoxide, etc., as well as metallic driers, such as cobalt naphthenate, may likewise be used with advantage, either singly or in various combinations.

If desired, there may also be added to the blocked urethane prepolymer compositions of the present invention cross-linking amounts of a polyhydroxyl-containing cross-linking agent. As discussed earlier, such crosslinking agents are frequently employed in the curing of what we have termed the "polyol-curable" urethanes. Often preferred crosslinking agents are the polyhydroxyl-containing fatty acid esters. Thus, the addition to the coating composition of castor oil or of a castor oil-pentaerythritol reaction product can, for instance, serve to enhance the flexibility and toughness of the final cured film.

The coating compositions of this invention are normally applied to solid substrates as films of less than 10 mils thickness and can contain other additives to impart special properties such as plasticizers, pigments, dyes, fillers, etc. Also, the substrate for the coating may be a specially treated material, including, for example, flammable members impregnated with fire-resistant chemicals or coated with a sealant.

The following examples serve to illustrate the present invention.

EXAMPLE I

A urethane prepolymer is prepared by the addition of 596 grams of tolylene diisocyanate (80/20, 2,4-/2,6-isomers) to 426 grams of polyoxypropylene glycol of about 1000 molecular weight, 110 grams of trimethylol propane, 11 grams of 2,6-ditertiary-butyl-4-methyl phenol dissolved in 850 grams of xylene and 580 grams of ethoxy ethanol acetate. The reaction mixture is held for five hours at 80° C. A prepolymer solution is obtained with a 4.7 wt. percent isocyanate content, 50 cps. viscosity and a 49% non-volatile content.

To 1000 grams of the above prepolymer solution are added 161 grams of hydroxy propyl methacrylate, 80 grams of ethoxy ethanol acetate and 80 grams of xylene. The reaction mixture is maintained at 128° C. for 8½ hours. The cooled reaction product is analyzed, giving values of: NV, 57.4%; percent NCO, 0.05%; and viscosity, 9 poises. The product is essentially viscosity stable, increasing less than one poise in five months.

A 3.0 mil film on tin plate cured with 1%, based on vehicle solids, of dicumyl peroxide for ½ hour at 150° C. gives a clear, glossy film of intermediate hardness.

A 3 mil film on tin plate without the peroxide and baked for ten minutes at 200° C. cures to a hard, flexible, more resistant film. A film from a similar urethane prepolymer made without the acrylate and cured in the same manner, without peroxide, is much softer and easily marred.

EXAMPLE II

To 1000 grams of the prepolymer solution of Example I is added 158 grams of hydroxyl ethyl methacrylate, 73 grams of xylene and 73 grams of ethoxy ethanol acetate. The reaction mixture is heated for 17 hours at 90° C. to obtain a product of 250 cps. viscosity at 52.1% non-volatile. The isocyanate content is 0%.

A 3 mil film is cured on tin plate for 30 minutes at 150° C. to obtain a clear, medium hard film.

EXAMPLE III

To 1000 grams of the prepolymer solution of Example I are added 207 grams of butyl amino ethyl methacrylate, 103 grams of xylene and 103 grams of ethoxy ethanol acetate. The reaction mixture is maintained at 80° C. for 13 hours. A clear vehicle is obtained after the addition of 175 grams of dimethyl formamide and 175 grams of methyl isobutyl ketone. The composition is essentially stable, increasing in viscosity from 50 to 54 cps. in 4 months. A 3 mil film cast on tin plate, catalyzed with 1% of dicumyl peroxide, is clear, hard, flexible and mar resistant.

EXAMPLE IV

To 700 grams of the prepolymer solution of Example I are added 45 grams of allyl alcohol, 22.5 grams of xylene and 22.5 grams of ethoxy ethanol acetate. The reaction mixture is maintained at 70°–100° C. for 24 hours. The product has a viscosity of 30 poises at 50.6% non-volatile and 0% NCO. A very slight viscosity increase is observed upon storing for 6 weeks. Without peroxide catalyst, a 3 mil film is cured for 30 minutes at 150° C. on tin plate to give an essentially colorless, hard and flexible film. The mar resistance of the film is seen to be improved by the addition of 1% of dicumyl peroxide to the vehicle prior to curing.

EXAMPLE V

To 100 grams of the allyl alcohol-blocked vehicle of Example IV is added 10 grams of a castor oil-pentaerythritol transesterification product with a hydroxyl content of 8.3% and 1 gram of dicumyl peroxide. A 3 mil film cured on tin plate is clear, hard, flexible and mar resistant.

EXAMPLE VI

A urethane prepolymer is made by the reaction of 40 grams of dicyclohexyl methane-4,4'-diisocyanate with 35 grams of 700 molecular weight adduct of 1,2,6-hexane triol and propylene oxide in the presence of 25 grams of xylene, 25 grams of ethoxy ethanol acetate, 0.75 grams of 2,6-ditertiary butyl-4-methyl phenol and 0.075 grams of dibutyl tin dilaurate. A vehicle of 5 poises viscosity at 60% non-volatile and 5.0% NCO is obtained. To 800 grams of the prepolymer solution are added 144 grams of hydroxy propyl methacrylate, 50 grams of ethoxy ethanol acetate and 50 grams of xylene. After heating at 128° C. for 6.5 hours a product of 16.5 poises at 58.2% non-volatile and 0% NCO is obtained. A clear, hard, tough film is obtained on tin plate after curing a 3 mil film for 15 minutes at 140° C. with 1% of dicumyl peroxide, or 30 minutes at 150° C. without the dicumyl peroxide.

The above acrylate-blocked prepolymer solution may also be reacted with castor oil, polyether or polyester to obtain clear, tough, mar-resistant films with hardness determined by the added constituent.

EXAMPLE VII

An enamel is prepared from 200 grams of the acrylate-blocked prepolymer solution of Example VI with 12 grams of $TiO_2$ by mixing in a Waring Blendor for 15 minutes. After the addition of 1% of dicumyl peroxide, based on the weight of vehicle solids, a 3 mil film is cast on tin plate and cured for 30 minutes at 150° C. The film is excellent in color and mar resistant. The enamel is storage stable, remaining ungelled over an extended period of time.

EXAMPLE VIII

Hydroxy ethyl methacrylate (129 grams) is substituted for the hydroxy propyl methacrylate in Example VI and the reaction conducted for 17 hours at 70° C.;

a product of 22 poises viscosity at 60.7% non-volatile and having 0.03% NCO is obtained. A 3 mil film on tin plate cured for 15 minutes at 150° C. is hard, flexible, essentially colorless and well adhered to the substrate. The film is also essentially non-yellowing when exposed to high intensity ultraviolet light.

EXAMPLE IX

To 400 grams of the prepolymer solution of Example VI are added 87 grams of butyl amino ethyl methacrylate, 85 grams of ethoxy ethanol acetate and 85 grams of xylene. After heating for 4.5 hours at 70° C., a product is obtained of 250 cps. viscosity at an NV of 43.4% and 0% NCO. A 3 mil film cast on tin plate and cured for 30 minutes at 150° C. is clear, smooth and medium hard.

EXAMPLE X

To 600 grams of the prepolymer solution of Example VI are added 94 grams of propylene glycol monoacrylate, 32 grams of ethoxy ethanol acetate and 32 grams of xylene. After heating for about 6 hours at 100° C. a vehicle is obtained of 29 poises viscosity at 60% non-volatile and 0% NCO. Two separate 3 mil films cast on tin plate, one with 1% of dicumyl peroxide and the other without peroxide, are cured at 150° C. in 15 and 30 minutes, respectively. Both films are essentially colorless, hard, flexible and mar resistant.

EXAMPLE XI

To 600 grams of the prepolymer solution of Example VI are added 61 grams of N-methacrylamide and 50 grams of ethoxy ethanol acetate. After heating for about 16 hours at 90° C. a product is obtained with a viscosity of 40 poises at 64.2% non-volatile and 0.02% NCO. A clear, hard, flexible and mar resistant film is obtained after curing a 3 mil film on tin plate for 10 minutes at 200° C.

EXAMPLE XII

To 600 grams of the prepolymer solution of Example VI are added 117 grams of 4-(4-hydroxy butyl)-2-vinyl-1,3-dioxolane and 78 grams of ethoxy ethanol acetate. After heating for about 7 hours at 60° C. a product is obtained of 230 poises viscosity at 60.0% non-volatile and 0.02% isocyante. A flexible, hard, 3 mil film is obtained on tin plate after curing for 10 minutes at 200° C.

EXAMPLE XIII

A urethane prepolymer is made by reaction of 26 grams of dicyclohexyl methane-4,4'-diisocyanate with 34 grams of castor oil in the presence of 39 grams of toluene and 0.6 grams of dibutyl tin dilaurate. A vehicle of 5.5 poises viscosity at 60% non-volatile and 3.7% NCO is obtained. To 600 grams of the prepolymer solution are added 86 grams of hydroxypropyl methacrylate. After heating at 60° C. for 5 hours a product of 29 poises at 63.8% non-volatile and 0% NCO is obtained. A clear, hard, flexible, mar resistant film is obtained on tin plate after curing a 3 mil film for 15 minutes at 150° C. with 1% of dicumyl peroxide, or for 30 minutes at 150° C. without the dicumyl peroxide.

EXAMPLE XIV

A blocked urethane prepolymer is made by reacting 142 grams of p,p'-diphenyl methane diisocyanate with 128 grams of 700 molecular weight adduct of 1,2,6-hexane triol and propylene oxide and 86 grams of hydroxypropyl methacrylate in the presence of 180 grams of xylene, 180 grams of ethoxy ethanol acetate and 0.17 gram of dibutyl tin dilaurate. After heating at 65° C. for 6.5 hours a product of 1.25 poises at 53 non-volatile and 0% NCO is obtained. A clear, hard, tough film is obtained on tin plate after curing a 3 mil film for 10 minutes at 200° C.

EXAMPLE XV

A polyurethane prepolymer is prepared by reacting 300 g. of bis(2-isocyanoethyl) fumarate, 99 g. of 700 molecular weight adduct of 1,2,6-hexanetriol and propylene oxide and 80 g. of 4,4'-isopropylidene diphenol in the presence of 0.47 g. of dibutyl tin dilaurate, 160 g. of Cellosolve acetate and 160 g. of xylene. The reaction mixture is held at 90° C. for 3 hours and results in a product having 59.4% non-volatile, 6.75 NCO, G+¼ viscosity, and 2½ Gardner color.

To 465 g. of the above prepolymer are added 120 g. of hydroxypropyl methacrylate, 107 g. of Cellosolve acetate and 107 g. of xylene. After heating for 5 hours at 130° C., 90 g. of methyl ethyl ketone are added and a product of 45% non-volatile, 0% NCO, Z6+½ viscosity and 2½ Gardner color results. When a 3 mil wet film thereof is cured on tin plate at 200° C. for ½ hour, without catalyst, a film exhibiting good hardness, flexibility, adhesion and mar resistance results.

EXAMPLE XVI

A prepolymer is made by adding, over a period of 30 minutes at 35° C., 45 grams of trimethylol propane to 221 grams of 1-isocyanato-3-isocyanatomethyl-3,5,5-trimethylcyclohexane, 89 grams ethoxy ethanol acetate, 89 grams xylene, and 0.7 gram dibutyl tin dilaurate. The reaction is continued for 3 hours at 65° C. and for 2 hours at 110° C. to give a prepolymer solution of 28 poises viscosity at 61.7% non-volatile and 8.8% isocyanate.

To 100 grams of the above prepolymer solution are added 30 grams of hydroxy propyl methacrylate and 20 grams of xylene. After heating for 6 hours at 110° C. a product is obtained of 34 poises viscosity at 60% non-volatile and 0.28% NCO. A 3 mil film cured at 150° C. in 15 min. is hard, mar resistant, essentially colorless, and non-yellowing under high intensity ultraviolet light.

It is claimed:
1. A normally-liquid coating composition comprising:
   (I) the reaction product of (A) an aliphatic or aromatic polyisocyanate-aliphatic polyol urethane prepolymer having a free isocyanate content of about 1 to 22 weight percent and (B) a heat releasable, monoethylenically, terminally unsaturated aliphatic compound blocking agent possessing only one isocyanate-reactive radical per molecule and selected from the group consisting of amino alcohol esters of unsaturated carboxylic acids, unsaturated alcohols, amides of unsaturated carboxylic acids, unsaturated hydroxy esters, and unsaturated hydroxy ethers, said reaction product containing the substantially stoichiometrical equivalent of (B) per equivalent of free isocyanate in (A), and;
   (II) crosslinking amounts of a polyhydroxyl-containing crosslinking agent, said crosslinking agent having been incorporated in the composition after the formation of said reaction product.

2. The composition of claim 1 wherein the isocynate-reactive radical of compound (B) is selected from the group consisting of —OH, —NH₂, and

radicals wherein R is alkyl of 1 to 10 carbon atoms.

3. The composition of claim 2 wherein the polyisocyanate is a diisocyanate.

4. The composition of claim 3 wherein the diisocyanate is an aliphatic diisocyanate.

5. The composition of claim 3 wherein the diisocyanate is an aromatic diisocyanate.

6. The composition of claim 3 wherein the compound (B) corresponds to the formula:

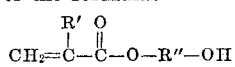

wherein R' is hydrogen or methyl and R" is alkylene of 2 to about 4 carbon atoms.

7. The composition of claim 6 wherein the diisocyanate is an aliphatic diisocyanate.

8. The composition of claim 7 wherein the compound (B) is hydroxypropyl methacrylate.

9. The composition of claim 8 wherein the aliphatic polyol is an adduct of 1,2,6-hexane triol and propylene oxide, said adduct having a molecular weight up to about 3000.

10. The composition of claim 9 wherein the crosslinking agent is a polyhydroxyl-containing fatty acid ester.

11. The composition of claim 10 wherein the aliphatic diisocyanate is dicyclohexyl methane-4,4'-diisocyanate.

12. The composition of claim 3 wherein the compound (B) is an unsaturated alcohol.

13. The composition of claim 12 wherein the diisocyanate is an aromatic diisocyanate.

14. The composition of claim 13 wherein the compound (B) is allyl alcohol.

15. The composition of claim 14 wherein the aliphatic polyol is polyoxypropylene glycol having a molecular weight up to about 3000.

16. The composition of claim 15 wherein the crosslinking agent is a polyhydroxyl-containing fatty acid ester.

17. The composition of claim 16 wherein the aromatic diisocyanate is tolylene diisocyanate.

18. The composition of claim 1 containing catalytic amounts of an organic peroxide curing catalyst.

19. The composition of claim 18 wherein the peroxide is dicumyl peroxide.

20. The composition of claim 3 wherein the aliphatic polyol is trimethylolpropane.

21. The composition of claim 20 wherein the urethane prepolymer has a free isocyanate content of about 11 to 22 weight percent.

22. The composition of claim 21 wherein the crosslinking agent is a polyhydroxyl-containing fatty acid ester.

23. The composition of claim 22 wherein the fatty acid ester is castor oil.

24. A normally-liquid coating composition comprising:
(I) the reaction product of (A) a urethane prepolymer reaction product of dicyclohexyl methane-4,4'-diisocyanate and an adduct of 1,2,6-hexane triol and propylene oxide, said adduct having a molecular weight of up to about 3000, said prepolymer having a free isocyanate content of about 1.5 to 22 weight percent, and (B) hydroxypropyl methacrylate, said reaction product containing the substantially stoichiometrical equivalent of (B) per equivalent of free isocyanate in (A),
(II) crosslinking amounts of castor oil, said castor oil having been incorporated into the composition after the formation of said reaction product, and
(III) catalytic amounts of dicumyl peroxide as curing catalyst.

25. A normally-liquid coating composition comprising:
(I) the reaction product of (A) a tolylene diisocyanate-polyoxypropylene glycol urethane prepolymer, said polyoxypropylene glycol having a molecular weight of up to about 3000, said prepolymer having a free isocyanate content of about 1.5 to 22 weight percent, and (B) allyl alcohol, said reaction product containing the substantially stoichiometrical equivalent of (B) per equivalent of free isocyanate in (A),
(II) crosslinking amounts of a polyhydroxyl-containing castor oil-pentaerythritol transesterification product, said transesterification product having been incorporated into the composition after the formation of said reaction product, and
(III) catalytic amounts of dicumyl peroxide as curing catalyst.

References Cited
UNITED STATES PATENTS

| | | | |
|---|---|---|---|
| 3,297,745 | 1/1967 | Fekete et al. | 260—77.5 X |
| 3,100,759 | 8/1963 | Boussu et al. | 260—77.5 |
| 3,012,993 | 12/1961 | Rogan | 260—77.5 |
| 2,958,704 | 11/1960 | Dinbergs | 260—77.5 |
| 3,371,056 | 2/1968 | Delius | 260—858 |
| 2,801,990 | 8/1957 | Seeger | 260—77.5 X |
| 3,425,988 | 2/1969 | Gorman et al. | 260—77.5 X |

FOREIGN PATENTS

| | | |
|---|---|---|
| 820,005 | 9/1959 | Great Britain. |
| 609,570 | 11/1960 | Canada. |

DONALD E. CZAJA, Primary Examiner

C. W. IVY, Assistant Examiner

U.S. Cl. X.R.

260—75, 77.5, 858, 859